UNITED STATES PATENT OFFICE.

JOHN H. SCHLUETER, OF RICHMOND, VIRGINIA.

CLOTHES-WASHING COMPOUND AND PROCESS OF MAKING THE SAME.

No. 931,498.   Specification of Letters Patent.   Patented Aug. 17, 1909.

Application filed February 27, 1909. Serial No. 480,444.

*To all whom it may concern:*

Be it known that I, JOHN H. SCHLUETER, a citizen of the United States of America, and a resident of Richmond, county of Henrico, State of Virginia, have invented a new and useful Clothes-Washing Compound and Process of Making the Same, of which the following is a specification.

My invention relates to an improved compound for washing clothing and also to the method of making the same, and it consists of the ingredients substantially as herein named and the method substantially as set forth of compounding the same.

In making my compound I preferably take paraffin 77 parts, salts of tartar (commonly known as potassium carbonate) 1½ parts, borax 2⅖ parts, potash lye 9⅗ parts of a strength about 98% pure, and concentrated liquid ammonia 9⅗ parts (the kind employed being what is known as stronger water of ammonia, containing about 28% ammonia gas). I first place the lye and borax in about half a pint of water and boil the same until these ingredients are dissolved; this requiring about five minutes. Very little chemical change takes place during this operation on account of the small quantity of borax. Effervescence occurs, thereby showing the production of a small quantity of borate of potassium. I then add the salts of tartar and continue the boiling until the salts of tartar have been dissolved. The salts are added at this point to avoid the unusual and troublesome effervescence that would occur if added while the borax and lye are being dissolved. Part of the salts of tartar combines with the boric acid in the borax and forms potassium borate and sodium carbonate, the latter being washing soda or sal soda. I then add to this boiling compound the paraffin (pure and refined grade) and continue to boil the mixture about five minutes, by which time the paraffin will have become entirely melted to a thin liquid state. I then remove the compound from the fire and let it stand until it becomes luke-warm, whereupon the ammonia is slowly poured in, the mass being stirred during the whole time of the pouring action. The compound is then poured into pans and after it has solidified sufficiently is cut up or molded into cakes, in which form it is preferably put on the market. The resultant article is a cake having the hardness and appearance of paraffin, except that it is clean and white and may be readily handled without soiling the fingers. It will readily and completely dissolve in hot water and it is best used in connection with ordinary soap, the two being placed in the tub together. The use of this compound not only avoids excessive rubbing of the clothing but also avoids boiling.

The paraffin serves simply to hold the ingredients together and to protect them against atmospheric effects, while at the same time forming a vehicle which is readily liquefiable in hot water. Some of the lye remains practically unchanged and a portion of the borax also remains unchanged, the portion changed having combined with the salts of tartar and lye to form potassium borate and sodium carbonate, both of which assist in detaching the dirt from the clothing. Most of the chemical changes take place before the ammonia is added. Practical tests show that the ammonia by its cleansing power makes the finished cake whiter in appearance, and because of its volatility it practically all escapes during the stirring and hardening processes. The ammonia is added after the other ingredients are dissolved and the liquid mass has cooled somewhat because if added to the mass while boiling it would escape before accomplishing its cleansing function.

Having thus fully described my invention, what I claim as new, and desire to secure by Letters Patent, is:—

1. The method herein described of making a paraffin-protected washing compound, consisting in first dissolving lye and borax in boiling water, then dissolving and stirring therein by boiling a quantity of salts of tartar, portions of the lye and borax being thus combined with the salts of tartar to form potassium borate and sodium carbonate, and then thoroughly mixing the resultant compound with melted paraffin and ammonia and allowing the mass to cool and harden.

2. The method herein described of making a paraffin-protected washing compound, consisting in first dissolving the washing ingredients together in boiling water, then thoroughly mixing the same with melted paraffin, and then after the mass becomes luke warm and before it hardens stirring in liquid ammonia to cleanse or whiten the mass.

3. A washing compound consisting of a cake of hardened and whitened paraffin impregnated throughout with lye, borax, potassium borate and sodium carbonate.

In testimony whereof I hereunto affix my signature in the presence of two witnesses this 26th day of February, 1909.

JOHN H. SCHLUETER.

Witnesses:
G. B. Hunter,
C. P. Cardwell.